United States Patent
Mitcsenkov et al.

(10) Patent No.: US 12,200,523 B2
(45) Date of Patent: Jan. 14, 2025

(54) MONITORING A COMMUNICATION NETWORK

(71) Applicant: Telefonaktiebolaget LM Ericsson (publ), Stockholm (SE)

(72) Inventors: Attila Mitcsenkov, Budapest (HU); Ferenc Szász, Budapest (HU); Attila Báder, Paty (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 313 days.

(21) Appl. No.: 17/909,050

(22) PCT Filed: Mar. 19, 2020

(86) PCT No.: PCT/EP2020/057699
§ 371 (c)(1),
(2) Date: Sep. 2, 2022

(87) PCT Pub. No.: WO2021/185452
PCT Pub. Date: Sep. 23, 2021

(65) Prior Publication Data
US 2023/0090169 A1    Mar. 23, 2023

(51) Int. Cl.
H04W 24/08    (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS

| | | | |
|---|---|---|---|
| 10,979,556 B2 * | 4/2021 | Kollipara | H04M 1/2535 |
| 11,025,782 B2 * | 6/2021 | Boussac | H04W 4/24 |
| 11,196,870 B2 * | 12/2021 | Vuppaladhadiam | H04L 65/1069 |
| 2008/0095069 A1 | 4/2008 | Thomas et al. | |
| 2018/0309616 A1 * | 10/2018 | Kollipara | H04W 24/08 |
| 2019/0320063 A1 * | 10/2019 | Kollipara | H04L 65/80 |

FOREIGN PATENT DOCUMENTS

WO    2017037598 A1    3/2017

* cited by examiner

*Primary Examiner* — Adolf Dsouza
(74) *Attorney, Agent, or Firm* — Murphy, Bilak & Homiller, PLLC (57) ABSTRACT

A method for monitoring a communication network comprises monitoring user plane information and control plane information for a first session provided by the communication network for a first wireless device; and correlating the user plane information and the control plane information to determine if the first session was ended due to a soft drop, wherein a soft drop corresponds to a user of the wireless device intentionally terminating the first session due to service quality issues.

19 Claims, 6 Drawing Sheets

MONITORING A COMMUNICATION NETWORK

TECHNICAL FIELD OF THE INVENTION

This disclosure relates to monitoring a communication network, and in particular to monitoring a communication network for soft drops where a user of a wireless device in the communication network intentionally terminates or ends a session with the communication network due to service quality issues.

BACKGROUND OF THE INVENTION

Network Management Systems (NMS) are used in Network Operation Centers (NOCs) of a mobile/communication network for ensuring proper daily operation of the network, as well as planning, executing maintenance and enhancement, improving tasks and processes of the network.

NMS include usually several subsystems. One of them is a Fault Management (FM) system, which receives, classifies (e.g. based on type, severity) and prioritises alarms from network elements (such as base stations, etc.). FM alarms are primarily input to the NOC, and are continuously monitored, analysed by the operations team, which initiates necessary actions, and opening a trouble ticket (TR), if needed. Background technical teams work on fixing issues based on importance of the TRs.

Service Operation Centers (SOCs), and related Customer Experience Management Systems (CEM), focus on monitoring, managing the subscribers, the services used by the subscribers, and services provided by the network for over the top (OTT) service providers. Monitoring to ensure service quality, therefore, is a substantial part of SOC operation.

One of the systems used by both in NOC and SOC is the network management Performance Monitoring (PM) system, which continuously collects PM counter information from each network element. PM counters provide sufficient information for monitoring the node performance, load and node failure issues, as well as basic radio environment issues (coverage, interference) or service-related accessibility or retainability issues, such as network related drops, setup or registration failures. The PM counters are also used for high level troubleshooting. Detailed troubleshooting is usually done by collecting and investigating node and subscriber traces collected from different part of the networks.

Service quality issues can be measured adequately at the subscriber end device. Terminal reports may be collected by the service provider. However, this is rarely available to network operators. Therefore, they perform drive tests to ensure service quality in different parts of the networks. Alternatively, they apply traffic probing to the data path and try to measure the packet level parameters and make conclusions about the actual service quality.

FM and PM based monitoring and analytics systems can have several limitations:

FM alarms are generated directly for node and network failures. Service-related issues that are not related directly to a node or network failure do not generate alarms.

PM systems do not detect service quality issues in the following cases:

Where counters are not implemented for the specific service issue;

If network protocols of the control plane report success codes, in case of e.g. a service failure, the event is not considered failure (even if user plane was faulty);

In many cases the issue is confined to certain dimensions, and with 'drilldowns' not available for the counter and the issue impacting a smaller subset of customers intensively, the averaging with the rest of the subscriber population within the counter hides the problems;

The counters refer to a single node or network element (NE), which hides cross-domain or interworking issues, which might be detected only by multiple events from more NEs;

The counters are based on time aggregated data, the counter values do not reflect temporary issues if the time resolution is inappropriate. Alarming thresholds for counters not taking into consideration network load variation and fluctuation of customers will be either overly sensitive at peak hours/hot spots, or unable to detect issues at silent periods.

It is especially difficult to detect network or terminal issues, which affects only a limited number of users, a limited area or network elements, and the quality issues do not appear in protocol or signalling messages. Such calls, sessions appear as successful events in PM systems.

In summary, problems in the network that impact customer experience badly (and hence, causing loss of reputation and customer churn for the operator) remain hidden from FM & PM based monitoring.

SUMMARY OF THE INVENTION

One particular area that is difficult to monitor is the occurrence of 'soft drops' for sessions between a wireless device and the communication network. A soft drop where a user of a wireless device in the communication network intentionally terminates or ends a session with the communication network due to service quality issues. For example the user hangs up a voice call or video call or stops streaming audio or a video due to audio stuttering or frame drops, or stops downloading a file due to a poor download speed. To the control plane, these types of session termination will not appear any different to a normal termination of a session by a user, e.g. where the conversation is finished and the user hangs up the voice call or video call, or the video finishes streaming, and so it is difficult to identify these using FM and PM based monitoring and analytics systems.

Certain aspects of the present disclosure and their embodiments may provide solutions to the above or other challenges.

According to a first aspect, there is provided a method for monitoring a communication network, the method comprising monitoring user plane information and control plane information for a first session provided by the communication network for a first wireless device; and correlating the user plane information and the control plane information to determine if the first session was ended due to a soft drop, wherein a soft drop corresponds to a user of the wireless device intentionally terminating the first session due to service quality issues.

According to a second aspect, there is provided a computer program product comprising a computer readable medium having computer readable code embodied therein, the computer readable code being configured such that, on execution by a suitable computer or processor, the computer or processor is caused to perform the method according to the first aspect.

According to a third aspect, there is provided an apparatus for monitoring a communication network, the apparatus configured to: monitor user plane information and control plane information for a first session provided by the communication network for a first wireless device; and correlate the user plane information and the control plane information to determine if the first session was ended due to a soft drop, wherein a soft drop corresponds to a user of the wireless device intentionally terminating the first session due to service quality issues.

According to a fourth aspect, there is provided an apparatus for monitoring a communication network, the apparatus comprising a processor and a memory, said memory containing instructions executable by said processor whereby said apparatus is operative to: monitor user plane information and control plane information for a first session provided by the communication network for a first wireless device; and correlate the user plane information and the control plane information to determine if the first session was ended due to a soft drop, wherein a soft drop corresponds to a user of the wireless device intentionally terminating the first session due to service quality issues.

BRIEF DESCRIPTION OF THE DRAWINGS

Various embodiments are described herein with reference to the following drawings, in which.

DETAILED DESCRIPTION OF THE PREFERRED EMBODIMENTS

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As noted above, this disclosure provides techniques for monitoring a communication network to detect soft drops. These are where a user of a wireless device in the communication network intentionally terminates or ends a session with the communication network due to service quality issues. Soft drops are difficult to monitor using FM and PM based monitoring and analytics systems, as, to the control plane, these types of session termination will not appear any different to a normal termination of a session by a user, e.g. where the conversation is finished and the user hangs up the voice call or video call, or the video finishes streaming.

Available user plane information can be media Quality of Service (QoS) parameters, such as media QoS parameters of Voice over Long Term Evolution (LTE) (VoLTE) calls, Video over LTE (ViLTE) calls, Voice over NR (VoNR) calls, or Web Real Time Communication (RTC), such as video conference applications. These are the types of media streams transported in Real-time Transport Protocol (RTP) packets and the RTP Control Protocol (RTCP) packets, or User Datagram Protocol (UDP) packets. Available control plane information can be information relating to signalling procedures, such as VoLTE/ViLTE/VoNR call-related Session Initiation Protocol (SIP) signalling procedures, particularly call termination-related cause codes and cause texts.

In the conventional drop-counter-based FM and PM monitoring solutions, a soft drop is not detectable from the SIP signalling perspective, since all the session termination procedures are reported as successful procedures by the PM counters. The only information available relating to the User Equipment (UE) is the User-Agent header field. This field does not contain the exact software version of the U E. From a user plane point of view, the only detectable symptom of a soft drop is that at a given point the RTP stream stops and the metrics were worsening before it stops. The counters of Internet Protocol (IP) Multimedia Subsystem (IMS) nodes handling the media streams will indicate a slight increase in the number of media related issues without pointing out the source of problem. From a soft drop perspective, the core network can be considered transparent, as none of the core network nodes can generate or produce any soft drop related metrics. Even if a subscriber/UE is re-establishing the call with the same party after the previous call, from the point of view of the node counters, this is not detectable, as none of the counters are defined on subscriber level.

However, the techniques described herein provide for soft drops to be detected by combining the user plane information and the control plane information. In particular user plane information and control plane information can be monitored for a first session provided by a communication network for a first wireless device, and the user plane information and the control plane information can be correlated to determine if the first session was ended due to a soft drop.

In certain embodiments, soft drop data for a number of sessions and wireless devices can be compiled to determine the behaviour of the communication network (or part of the communication network), and this current behaviour can be compared to previous behaviour for the communication network (or part of the communication network) to determine if the behaviour of the communication network is anomalous.

Thus, embodiments provide a network analytics system which discovers hidden network related problems that cause service quality issues but do not appear in performance management or fault management systems explicitly.

The proposed issue discovery module correlates control plane and user plane information (e.g. key performance indicators (KPIs) and events), to detect incidents impacting sessions and customers individually. Such correlation leads to detection of hidden problems, such as "soft" incidents, which means that the issue would otherwise not be reported or would be reported with a success cause code on the control plane, but was due to poor service quality experience for the subscriber. For example, media quality degradation may lead to call termination by the user, which is not visible as a call drop on the control plane. In embodiments, user plane QoS metrics are correlated with call/session level signalling data in the control plane.

In some embodiments, attributes of the session (e.g. relating to the call and/or subscriber) are used to label issues accordingly. These can be considered as "dimensions" for aggregating incidents (soft drops). Some exemplary dimensions of incidents for monitoring new terminal devices or software introductions/updates can include the identity of the terminal vendor, the terminal model and software version (which can be acquired from the International Mobile Equipment Identity (IMEI) and User-Agent fields). For monitoring serving network elements (NEs), some example dimensions can be a cell/site identifier, an IP address of the serving Core Network (CN) and IP Multimedia Subsystem (IMS) nodes. Radio-related issues might be tied to specific frequency bands. Interworking/cross-domain issues may be discoverable by a combination of such dimensions.

In embodiments, an anomaly detection module can learn by statistical or machine learning methods the normal patterns (e.g. timely behaviour) of the network for specific metrics such as failure (soft drop) rates, grouped by combinations of different network, subscriber, service or terminal dimensions, such as terminal models of the same vendor, software versions, or different network elements, or subscriber subscription type. The anomaly detection module can learn the normal behaviour using a 'soft drop rate' as the "target variable" of the machine learning or statistical analysis as a function of time, using the dimensions of incidents (soft drops) as "features" (according to the generally standard machine learning terminology).

Using the learnt behaviour, the network performance/behaviour for upcoming time periods can be predicted (e.g. in terms of the 'soft drop rate'), and it can be detected if the actual behaviour significantly differs from the normal patterns for a specific dimension or dimensions. In this case the anomaly detection module can detect abnormal behaviour if the recent behaviour differs or significantly differs from the normal behaviour for the same feature/dimension, or in some cases, detect abnormal behaviour if the recent behaviour for a particular dimension differs or significantly differs from the normal behaviour for a similar (but different) dimension. The latter approach is useful, for example, to identify whether a particular type of terminal device or terminal device having a particular software version has more service quality issues than other (similar) types of terminal device. The anomaly detection module can highlight the given dimensions where problems persist can be highlighted.

In some embodiments, the soft drop rate/soft drop ratio (e.g. proportion of sessions that are 'soft dropped') can be monitored as a function of certain features (e.g. vendor, model, software version) and time (e.g. over predefined timeslots such as 5 minutes or 1 hour).

The above techniques and the various embodiments described herein can provide one or more of the following advantages:
  The system and solution can automatically detect service-related issues that are not necessarily related directly to a node or network failure and do not generate alarms.
  It is able to indicate service quality issues when
    the control plane protocols report success codes, in case of e.g. a service failure, but the user plane is seriously degrading customer experience (and the event is not considered as failure by the FM/PM system);
    the counters based on time aggregated data are unable to detect abnormal behaviour due to inappropriate threshold sensitivity or time resolution;
    issues impact only a specific subset of subscribers, but the given dimensions are not available as drilldown dimensions for the specific counter in the FM system;
    counters refer to a single node or network element and the issue can be detected by multiple events from more NEs, i.e. impact of an issue is specific for a segment of the network identified by cross-domain dimensions (e.g. device specific being unknown for the FM counters).
  It can detect network or terminal related issues which affect only a limited number of users, a limited area and/or a limited number of network elements, and the quality issues do not appear in protocol or signalling messages.

Figure 1:
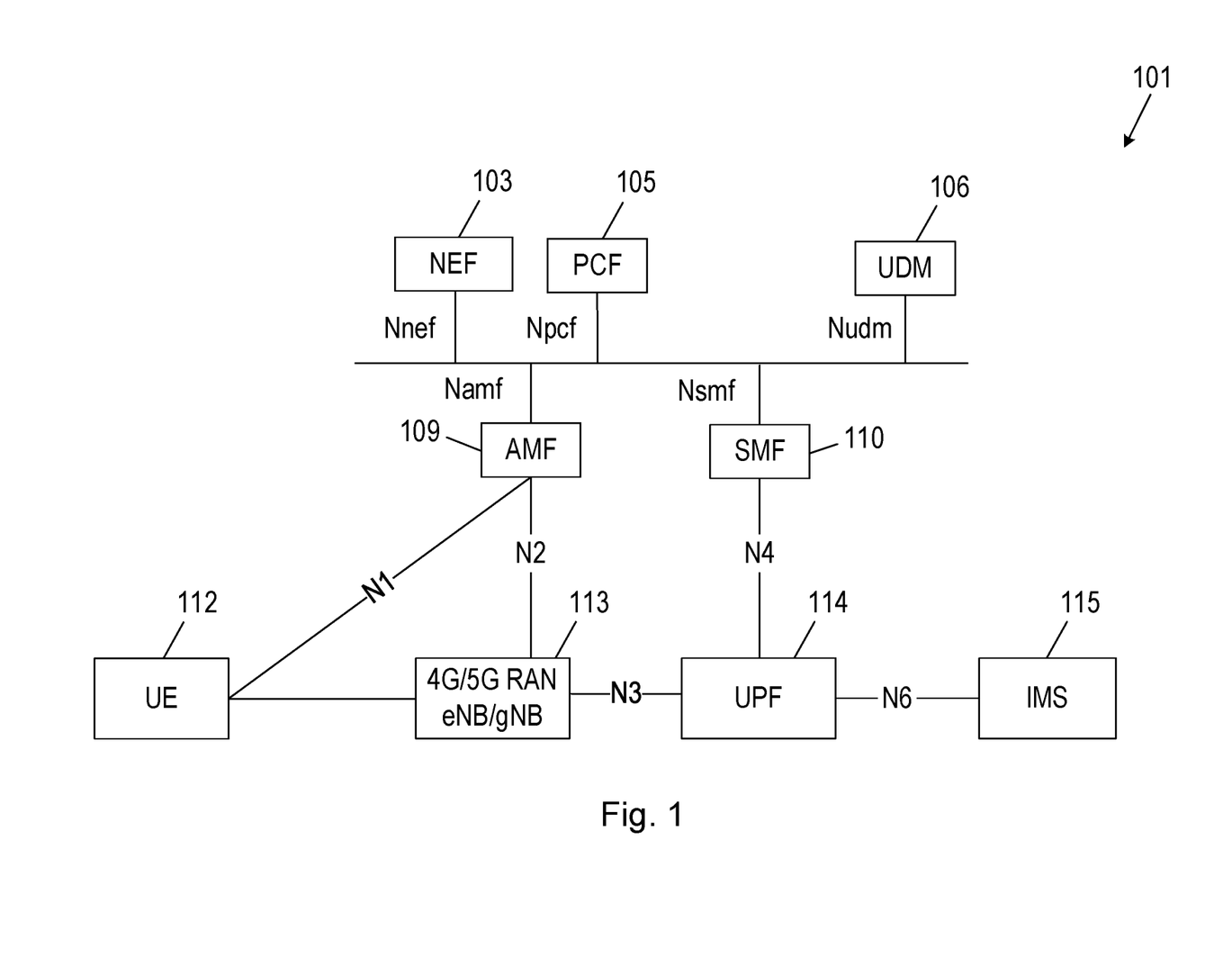
FIG. 1 illustrates a network architecture to which the techniques described herein can be applied.

Thus, as noted above, to detect soft drop incidents, both user- and control-related metrics must be correlated. FIG. 1 illustrates an exemplary network architecture to which the techniques described herein can be applied. It will be appreciated that while FIG. 1 illustrates part of a 5G network and a 4G or 5G radio access network (RAN), the techniques described herein are applicable to other types of network (e.g. 2G and 3G networks) where soft drops may occur.

In 5G, to facilitate cloud native implementations and deployments, a Service-Based Architecture (SBA) has been introduced, based on the concept of Network Functions (NF) offering and consuming NF Services over Service Based Interfaces (SBIs). A service-based Network Function (NF) interaction with other network functions can be characterised by: the NF registering in a Network Repository Function (NRF) the list of supported NF services; other NFs can discover the NF services using the NRF and select a specific instance of the NF; and the NFs consume NF services of the selected NF instance.

FIG. 1 illustrates a 5G system reference architecture/communication network 101 showing service-based interfaces used within the Control Plane (CP). It will be appreciated that not all NFs are depicted. Service-based interfaces are represented in the format Nxyz and point to point interfaces in the format Nx. The reference architecture 101 comprises a Network Exposure Function (NEF) 103 that has a Nnef interface, a Policy Control Function (PCF) 105 that has a Npcf interface, a Unified Data Management (UDM) 106 that has a Nudm interface, an Access and Mobility Management Function (AMF) 109 that has a Namf interface, and a Session Management Function (SMF) 110 that has a Nsmf interface.

The AMF 109 has an N1 interface to a user equipment (UE) 112, and an N2 interface to a radio access network (RAN) 113. The RAN 113 can be a 5G RAN that comprises a number of base stations (gNBs) and/or a 4G RAN that comprises a number of base stations (eNBs). The SMF 110 has an N4 interface to a User Plane Function (UPF) 114. The interface between the RAN 113 and the UPF 114 is the N3 interface, and the interface between the UPF 114 and an IMS 115 is the N6 interface.

The NEF 103 supports different functionality, and the NEF 103 acts as the entry point into the operator's network, so an external application function (AF) interacts with the 3GPP Core Network through the NEF 103.

In embodiments of the present disclosure, the UPF 114 is a capture point for user plane information, such as media QoS parameters, and the IMS 115 is a capture point of the control plane information, such as signalling data. Thus, the user plane information is obtained or captured from the UPF 114 and the control plane information is obtained or captured from the IMS 115. In alternative embodiments, the IMS 115 can be capture point for both user plane information and the control plane information. In particular, the user plane information could be obtained inside the IMS 115 on an access side of an Access Gateway, and this approach can involve an additional data source inside the IMS 115, such as Media Gateway Control (MEGACO-H248) messages between a Proxy-Call Session Control Function (P-CSCF) and an Access Gateway (AGW).

In general, a communication network 101, or wireless network, may include a number of network nodes or network elements (NEs) to support communication between wireless devices or between a wireless device and another communication device, such as a landline telephone, a service provider, or any other network node or end device. Such communications are referred to herein as 'sessions'.

A communication network 101 may comprise and/or interface with any type of communication, telecommunication, data, cellular, and/or radio network or other similar type of system. In some embodiments, the communication network 101 may be configured to operate according to specific standards or other types of predefined rules or procedures. Thus, particular embodiments of the communication network 101 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The communication network 101 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

As used herein, network node refers to equipment capable, configured, arranged and/or operable to communicate directly or indirectly with a wireless device and/or with other network nodes or equipment in the communication network 101 to enable and/or provide wireless access to the wireless device and/or to perform other functions (e.g., administration) in the communication network 101. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralised digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the communication network 101 or to provide some service to a wireless device that has accessed the communication network 101.

Figure 2:
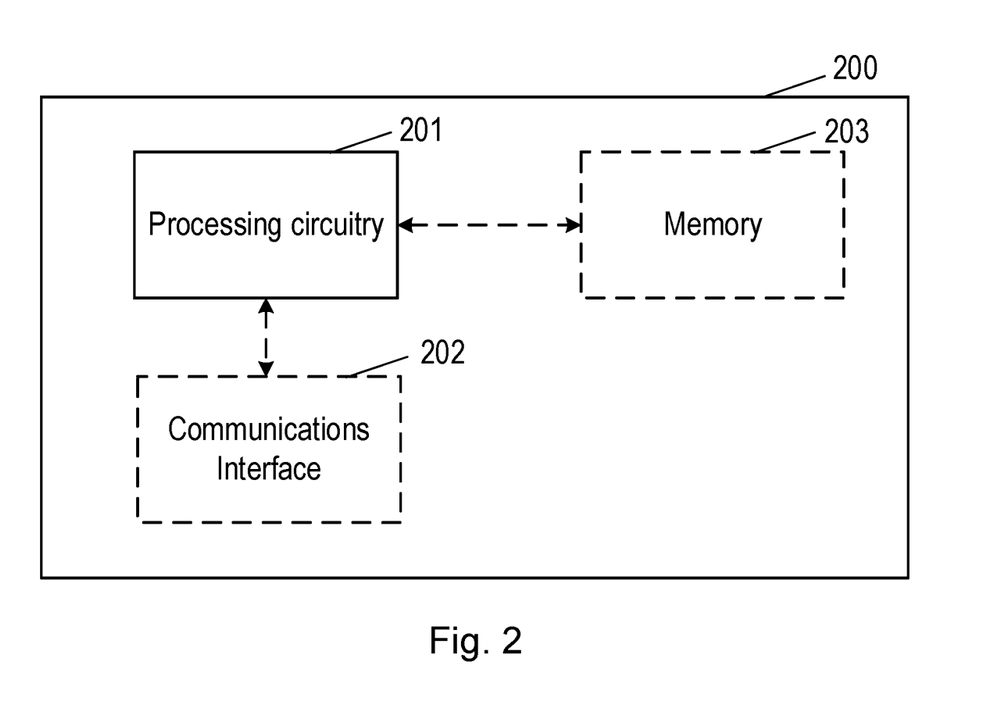
FIG. 2 is a block diagram illustrating an exemplary apparatus or device that can be used to implement the techniques described herein.

FIG. 2 is a block diagram illustrating an exemplary apparatus or device that can be used to implement the techniques described herein. It will be appreciated that the apparatus 200 may comprise one or more virtual machines running different software and/or processes. The apparatus 200 may therefore comprise one or more servers, switches and/or storage devices and/or may comprise cloud computing infrastructure that runs the software and/or processes.

The processing circuitry 201 controls the operation of the apparatus 200 and can implement the methods described herein in relation to the apparatus. The processing circuitry 201 can comprise one or more processors, processing units, multi-core processors or modules that are configured or programmed to control the apparatus 200 in the manner described herein. In particular implementations, the processing circuitry 201 can comprise a plurality of software and/or hardware modules that are each configured to perform, or are for performing, individual or multiple steps of the method described herein in relation to the apparatus.

In some embodiments, the apparatus 200 may optionally comprise a communications interface 202. The communications interface 202 of the apparatus 200 can be for use in communicating with other nodes, such as other virtual nodes. For example, the communications interface 202 of the apparatus 200 can be configured to transmit to and/or receive from other nodes or network functions requests, resources, information, data, signals, or similar. The processing circuitry 201 of apparatus 200 may be configured to control the communications interface 202 of the apparatus 200 to transmit to and/or receive from other nodes or network functions requests, resources, information, data, signals, or similar. In some embodiments, the communications interface 202 can enable the apparatus 200 to obtain or capture the user plane information from the UPF 114 and/or the control plane information from the IMS 115.

Optionally, the apparatus 200 may comprise a memory 203. In some embodiments, the memory 203 of the apparatus 200 can be configured to store program code that can be executed by the processing circuitry 201 of the apparatus 200 to perform the method described herein in relation to the apparatus 200. Alternatively or in addition, the memory 203 of the apparatus 200, can be configured to store any requests, resources, information, data, signals, or similar that are described herein. The processing circuitry 201 of the apparatus 200 may be configured to control the memory 203 of the apparatus 200 to store any requests, resources, information, data, signals, or similar that are described herein.

Figure 3:
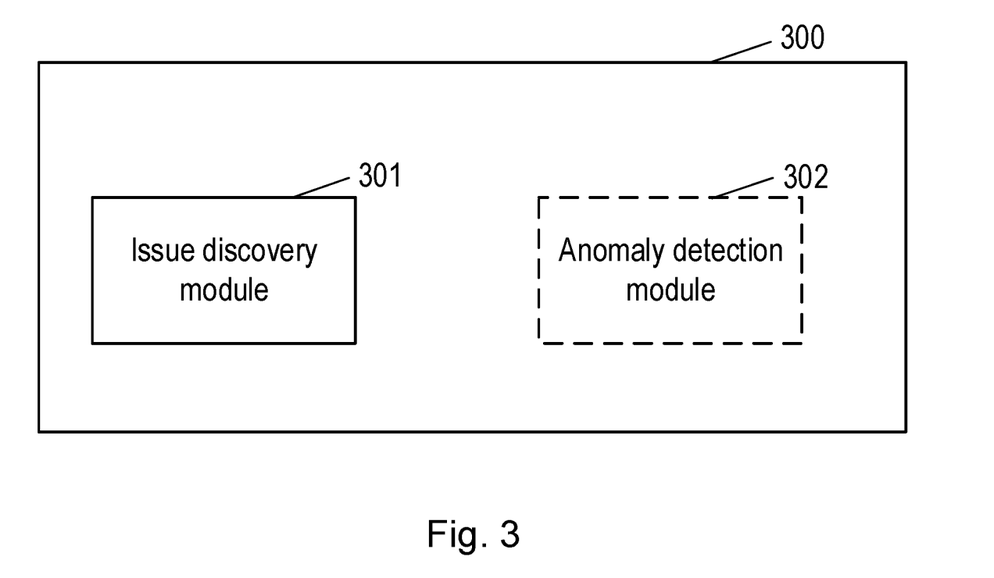
FIG. 3 is a block diagram illustrating an exemplary virtual apparatus or device that can be used to implement the techniques described herein.

FIG. 3 is a block diagram of an exemplary virtual apparatus or device that can be used to implement the techniques described herein. The virtual apparatus 300 can be implemented in or with a communication network, and is operable to carry out the example methods described herein. The virtual apparatus 300 comprises an Issue Discovery module 301 that is used to correlate the control plane and user plane information to identify soft drop incidents. In some embodiments, the virtual apparatus 300 also comprises an Anomaly Detection module 302 that is used to determine the normal behaviour of the network from the identified soft drop incidents, and detect abnormal behaviour if the recent behaviour differs or significantly differs from the normal behaviour.

Virtual apparatus 300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause Issue Discovery module 301 and Anomaly Detection module 302 to perform corresponding functions according one or more embodiments of the present disclosure.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 4:
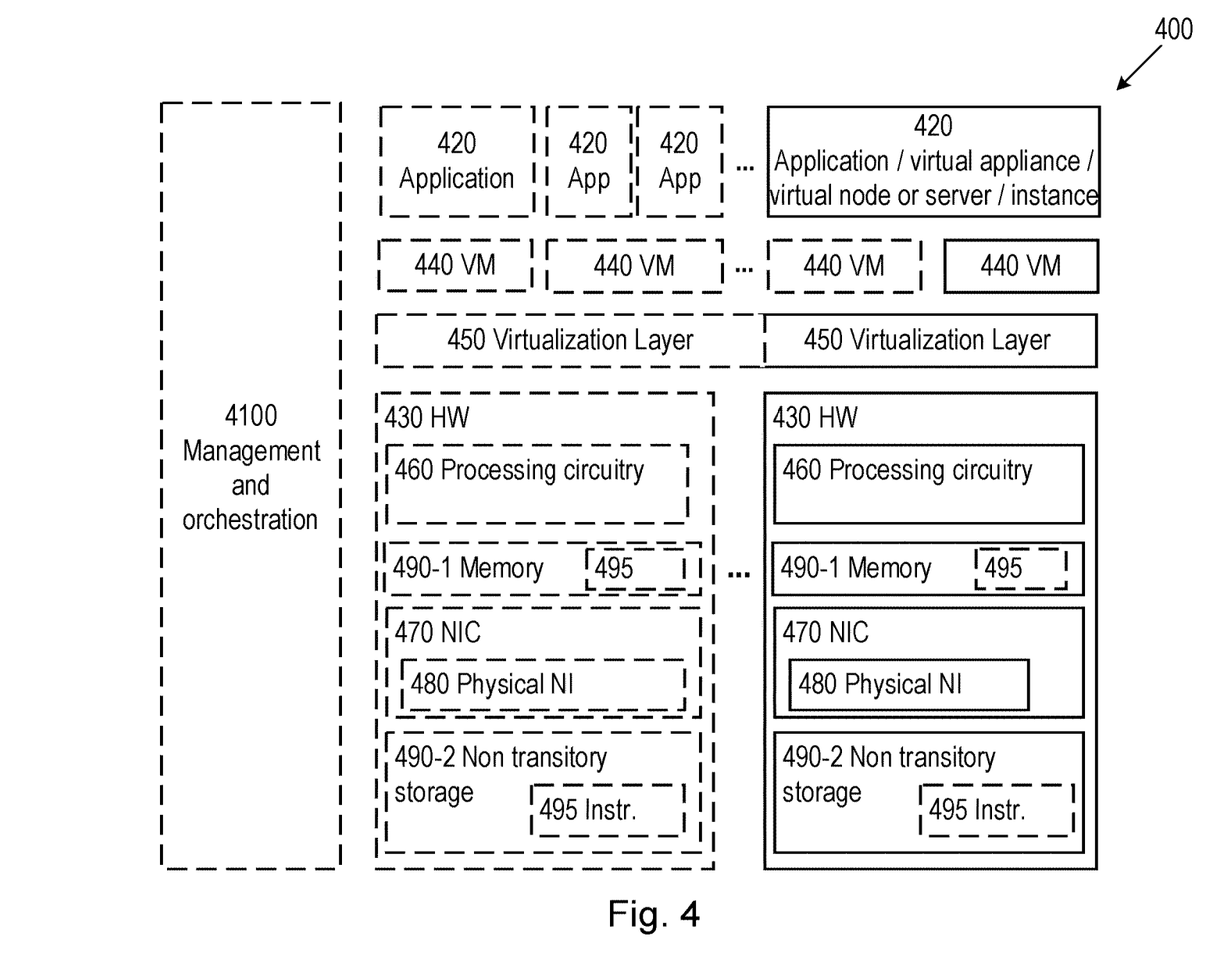
FIG. 4 is a schematic block diagram illustrating a virtualisation environment in which functions implemented by some embodiments may be virtualised.

FIG. 4 is a schematic block diagram illustrating a virtualisation environment 400 in which functions implemented by some embodiments may be virtualised. In the present context, virtualising means creating virtual versions of apparatuses or devices which may include virtualising hardware platforms, storage devices and networking resources. As used herein, virtualisation can be applied to a node (e.g., a virtualised base station or a virtualised radio access node), to a device (e.g., a UE, a wireless device or any other type of communication device) or to an apparatus for implementing the soft drop monitoring, or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualised.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualisation environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualisation environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualisation layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualisation layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualisation layer 450, which may sometimes be referred to as a virtual machine monitor (VMM). Virtualisation layer 450 may present a virtual operating platform that appears like networking hardware to virtual machine 440.

As shown in FIG. 4, hardware 430 may be a standalone network node with generic or specific components. Hardware 430 may be part of a larger cluster of hardware (e.g. such as in a data centre or customer premise equipment (CPE)) where many hardware nodes work together and are managed via management and orchestration (MANO) 4100, which, among others, oversees lifecycle management of applications 420.

Virtualisation of the hardware is in some contexts referred to as network function virtualisation (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualised machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

The techniques presented herein will now be described in more detail with reference to FIG. 5, which is a flow chart illustrating an exemplary method according to certain embodiments. This method can be performed by the apparatus or device 200 shown in FIG. 2, the virtual apparatus or device 300 shown in FIG. 3, or the virtualisation environment 400 shown in FIG. 4.

In a first step, step 501, a time series for a soft drop ratio is derived. User plane information and control plane information can be monitored for a first session provided by the communication network for a first wireless device, and the user plane information and the control plane information correlated to determine if the first session was ended due to a soft drop. This can be repeated for multiple sessions provided by the communication network for the first wireless device and other wireless devices, and a failure rate (ratio of soft drops or 'soft drop ratio') determined for particular time instants or time intervals. The failure rates form a time series.

The user plane information can be can be media QoS parameters, such as media QoS parameters of VoLTE/ViLTE/VoNR/Web RTC calls. These are the media streams transported in RTP packets and the RTCP packets. This user information can be obtained from the UPF 114. The control plane information can be information relating to signalling procedures, such as VoLTE/ViLTE/VoNR call-related SIP signalling procedures, particularly call termination-related cause codes and cause texts.

Those skilled in the art will be aware of various techniques for correlating user plane information and control plane information for a particular session to determine some insight into that session. For example the correlation logic described in WO 2017/037598 (PCT/IB2016/055120) can be used to collect the user plane information and the control plane information for individual sessions, and to correlate that information. Records of the correlated data provide information from both domains, and also their temporal relationship, enabling the monitoring system to detect the time difference between events on the user plane and control plane.

Media (e.g. voice or video) quality degradation is, to some extent, tolerable to end-users, but at a certain level it impacts the service in a way that leads to intentional call/session termination by the user. These types of intentional call terminations will not be detected as a call/session drop, but as a normal call/session termination. However, correlating the user plane information and the control plane information leads to identification of such "soft drop" incidents. For example, a soft drop can be identified where there is serious or significant media quality degradation preceding the call/session termination, for example between 5-15 seconds before the call/session termination. A further, and potentially stronger, indication is if the subscriber re-establishes the call/session within a short time after termination, for example between 5-20 seconds after the call/session termination.

Upon detection of these incidents, in certain embodiments values are determined or noted for one or more dimensions ("attributes") relating to, for example the subscriber/customer/UE or the respective session, e.g. the cell serving the customer at the time of incident (soft drop), vendor and model of the used terminal, network node addresses traversed by the customer session, etc. This attribute information can be used in step 603 to 'drill down' the soft drop ratios into different dimensions. That is, the soft drop information for a particular value or set of values of an attribute/dimension can be evaluated together to determine a soft drop ratio for that value or set of values.

Thus, control plane and user plane information (KPIs and events) are correlated to detect soft drops impacting sessions and customers individually. This correlation can be performed by Issue Discovery module 301. Attributes/dimensions of the session or subscriber are used to label soft drops accordingly, and act as "features" of the soft drop in subsequent analysis.

Once soft drops have been identified, normal behaviour of the communication network can be determined (step 505). The normal behaviour of a network can be described by a time series of various metrics (according to step 501), such as respective failure rates (e.g. soft drop rates) for certain times or time intervals. These may not only be "global" failure rates (e.g. across the whole network for all sessions), but also several "drilldowns"/"local", i.e. time series of failure rates for sessions with various dimensions, e.g. by terminal type, network nodes or other user groups (according to step 503).

These time series in communication networks may have typical periodic components, such as daily and/or weekly profiles (and potentially longer term periodic components or trends as well). By observing the communication network for a period of time (referred to as the learning process), a mathematical model (such as a statistical method or Machine Learning model) captures the typical characteristics of these time series. The normal behaviour of the communication network may not only be learnt for different dimensions, but also for different time scales (e.g. hourly, daily, weekly, etc.). The normal behaviour of the communication network can be determined by the Anomaly Detection module 302.

Embodiments of the proposed solution, however, use the network related dimensions and time information as features, which goes beyond traditional time series analysis solutions, adding the capability to influence predictions not only by past behaviour of a given time series, but also its "neighbouring" time series, being different only in some dimensions.

Learnt patterns can be used to make predictions for a failure rate for an upcoming time period, based on the observed time series of the communication network for the past days and weeks. A confidence interval may also be defined based on predictability of the chosen metric (e.g. soft drop ratio) for desired dimension combinations (step 507). If the soft drop ratio is stable or highly predictable, confidence intervals will be narrow and anomaly detection (i.e. a deviation from the normal soft drop ratio) is sensitive. The graph in FIG. 6 shows an exemplary time series of predicted soft drop ratios (expressed as a percentage soft drop rate) and the associated confidence intervals over a time period of 168 hours (7 days). Thus it can be seen that the predicted soft drop ratios follow a roughly periodic pattern across each day.

In step 509, the predictions can be compared to the most recent measured metric (e.g. soft drop ratio), which reflects the current behaviour of the communication network, and the difference between the current behaviour and the predicted behaviour can be compared to the confidence interval. If the deviation of the value for the current behaviour from the prediction is significant for an otherwise predictable metric (i.e. the difference does not fit with the confidence interval), an anomaly can be detected.

It should be noted that metrics that are stable, at least beyond a daily and weekly periodic component, are suitable for anomaly detection, i.e. identifying situations when the network deviates from its "normal" behaviour. A failure rate, i.e. the ratio of soft drops suffered by the subscribers/customers to sessions, is a relatively stable metric, eliminating the direct impact of network load/traffic fluctuation.

In step 611, any detected anomaly is evaluated, and an incident raised for the appropriate dimension(s). For example, in the case of an anomaly associated with a particular cell, the anomaly can be escalated to a network engineer. In the case of an anomaly associated with a particular terminal model and software version, the anomaly can be escalated to the manufacturer of the terminal model.

As an example, the predicted soft drop rate for 'Type1' devices from 'vendor A' between 15:00-16:00 on Tuesday is expected to be around 1.25%. More formally, a normal distribution may be calculated during the learning process with a mean value $\mu=1.25$ and a standard deviation of $\sigma$. Knowing $\mu$ and $\sigma$ helps to derive an "anomaly probability" of a measured soft drop rate of x using the respective probability density function.

The above monitoring and analysis of the soft drop behaviour described above can identify several different types of failure scenarios that may be hidden from traditional FM and PM monitoring based solutions. These include:

Core network routing configuration issues, when the control plane signalling follows the subscriber/UE, but the user plane connectivity is lost between the UE and Border Gateway Function (BGF) following a handover. In this case it may be that not all, or not even a majority of, calls traversing the BGF are lost, but only those that follow a specific mobility path. This issue can be detected with the methods described herein, e.g. when the soft drop ratio is checked as a function of different Access Point Names (APNs) or subnets.

The user plane network element gets overloaded, degrading performance (i.e. transcoding introduces high jitter at BGF), however the control plane is healthy. This issue can be detected with the methods described herein, e.g. when the soft drop ratio is checked as a function of BGF node instances or IP addresses.

After a software upgrade, a specific type of terminal device starts to follow an erroneous codec mode/bitrate adaptation behaviour, or changes the jitter buffer management, resulting in lower voice quality robustness at cell edges, causing soft drops. However this is only for a specific terminal type or software version, and is insignificant for any network element counters. This issue can be detected with the methods described herein, e.g. when the soft drop ratio is checked as a function of different terminal versions and/or codec types.

Interworking issues among specific core network nodes and devices introduced with a node or terminal software upgrade, causing soft drops during Single Radio Voice Call Continuity (SRVCC) or handover events (timeouts or jitter buffer management conflicts). However, as it affects only a specific subset of terminals and nodes, on average in node counters the impact is not significant. This issue can be detected with the methods described herein, e.g. when the soft drop ratio is checked as a function of different terminal versions and core network node instances/IP addresses.

Figure 7:
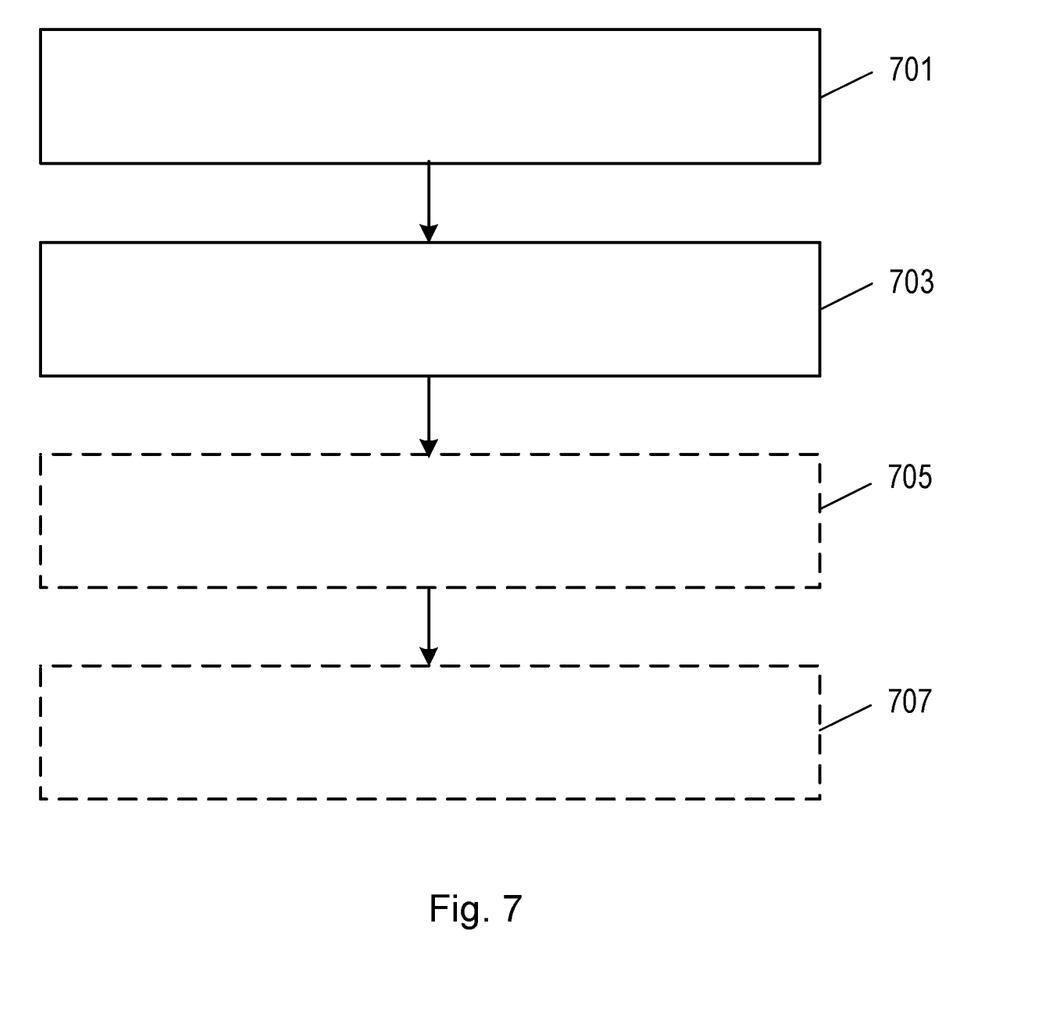
FIG. 7 is a flow chart illustrating an exemplary method according to general embodiments.

The flow chart in FIG. 7 illustrates an exemplary method for monitoring a communication network according to general embodiments. In step 701, user plane information and control plane information for a first session provided by the communication network for a first wireless device is monitored. This monitoring can be as described above for step 501. Thus, in some embodiments the user plane information comprises QoS parameters for the first session. The QoS parameters may comprise QoS parameters of VoLTE, ViLTE, VoNR, and/or Web RTC calls. In some embodiments the user plane information is obtained from a UPF. In alternative embodiments, the user plane information is obtained from an IMS. In some embodiments the control plane information comprises information relating to signalling procedures for the first session. The information relating to signalling procedures can comprise call-related SIP signalling procedure information. The control plane information can be obtained from an IMS.

In step 703, the user plane information and the control plane information is correlated to determine if the first session was ended due to a soft drop. As noted above, a soft drop corresponds to a user of the wireless device intentionally terminating the first session due to service quality issues.

In step 705, which is optional, soft drop data for a plurality of sessions provided by the communication network for a plurality of wireless devices in a first time interval can be compiled to determine current soft drop behaviour for the communication network. The first interval may be a period of minute(s), hour(s), day(s), week(s), etc.

Each session can have values for one or more attributes relating to the session and/or the wireless device the session relates to, and in some embodiments the current soft drop behaviour for the communication network can be determined for a first set of sessions in the first time interval having a selected value or selected set of values of the one or more attributes. As examples, the one or more attributes can comprise any of a wireless device vendor identity, a wireless device model, a wireless device software version, a cell/site identifier, an IP address of the serving CN and IMS nodes, or frequency band used for the session.

In some embodiments, the selected set of values of the one or more attributes includes all values for the one or more attributes. In this way, the current soft drop behaviour is determined for all wireless devices and all parts of the communication network. However, in other embodiments, the selected set of values of the one or more attributes is a subset of the possible values of the one or more attributes. That is, the selected set of values relates to only some of the possible values (e.g. a particular terminal model and/or software version, or particular cell site), and the current soft drop behaviour is determined in step 705 for those selected values.

In some embodiments, the current soft drop behaviour for the first set of sessions comprises a soft drop ratio that is a ratio of the number of sessions in the first set of sessions that are determined to have been ended due to a soft drop to the total number of sessions in the first set of sessions. Where the current soft drop behaviour relates to a subset of the possible attribute values, the soft drop ratio is a ratio of the number of sessions in the first set of sessions having the selected value or selected (sub)set of values that are determined to have been ended due to a soft drop to the total number of sessions in the first set of sessions having the selected value or selected (sub)set of values.

In step 707, which is optional, it can be determined if the soft drop behaviour of the communication network is anomalous by comparing the determined current soft drop behaviour to soft drop behaviour predicted for the first time interval.

Step 707 may comprise determining if the current soft drop behaviour of the communication network is anomalous by comparing the determined current soft drop behaviour to the soft drop behaviour predicted for the first time interval. In some embodiments, the soft drop behaviour predicted for the first time interval is based on soft drop data for a second set of sessions provided by the communication network for a plurality of wireless devices in a previous time interval (i.e.

before the first time interval). This previous time interval is also referred to herein as a 'second time interval'. The sessions in the second set of sessions used to predict the soft drop behaviour for a subsequent time interval will be those sessions having the same selected value or selected set of values of the one or more attributes as the sessions to be evaluated in the first time interval.

In some embodiments, the soft drop behaviour predicted for the first time interval is a predicted soft drop ratio that is a ratio of the number of sessions that are predicted to end due to a soft drop to a total number of sessions. As above, where the current soft drop behaviour is to relate to a subset of the possible attribute values, the predicted soft drop ratio is a ratio of the number of sessions in the second set of sessions having the selected value or selected (sub)set of values that are determined to have been ended due to a soft drop to the total number of sessions in the second set of sessions having the selected value or selected (sub)set of values.

In some embodiments, the soft drop behaviour predicted for the first time interval is predicted using statistical or machine learning techniques. In some embodiments, the soft drop behaviour predicted for the first time interval includes a confidence interval. In this case, step 707 comprises determining the soft drop behaviour of the communication network is anomalous if the determined current soft drop behaviour is outside of the confidence interval for the soft drop behaviour predicted for the first time interval.

In some embodiments, the method further comprises determining a current soft drop behaviour for the communication network for a third set of sessions in a third time interval having a different selected value or different selected set of values of the one or more attributes. The third time interval may correspond or partly overlap with the first time interval. Step 707 can be repeated for the third set of sessions to determine if the soft drop behaviour of the communication network is anomalous by comparing the determined current soft drop behaviour to predicted soft drop behaviour for sessions having the different selected value or different selected set of values of the one or more attributes in the third time interval.

In some embodiments, for example where a value or subset of values of the possible values of the attribute are selected, each of the steps 701-707 can be repeated for a different value or different subset of values for the one or more attributes. In this way, the behaviour of the communication network for different values or different subsets of values of the one or more attributes can be determined.

Figure 5:
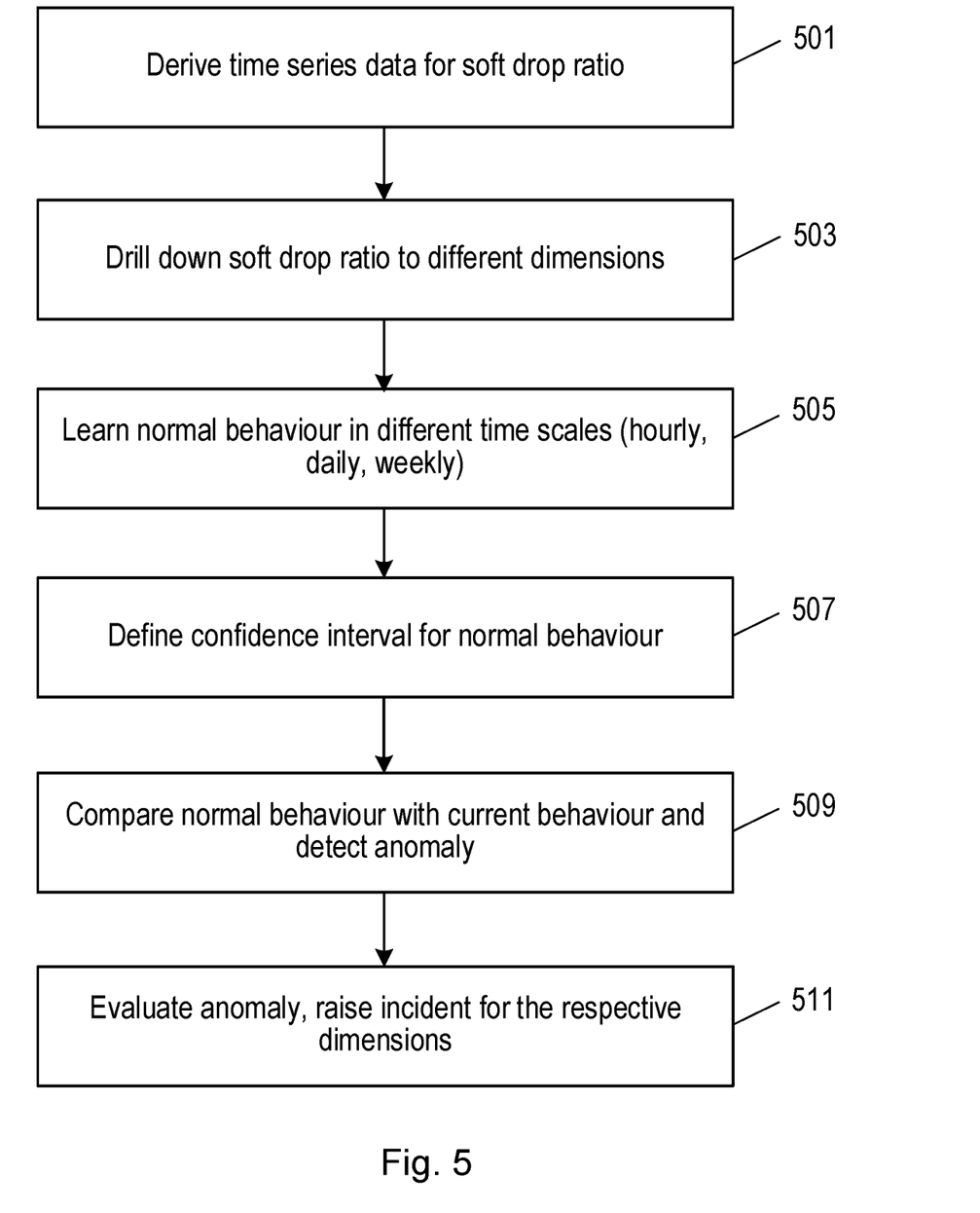
FIG. 5 is a flow chart illustrating an exemplary method according to certain embodiments.
Figure 6:
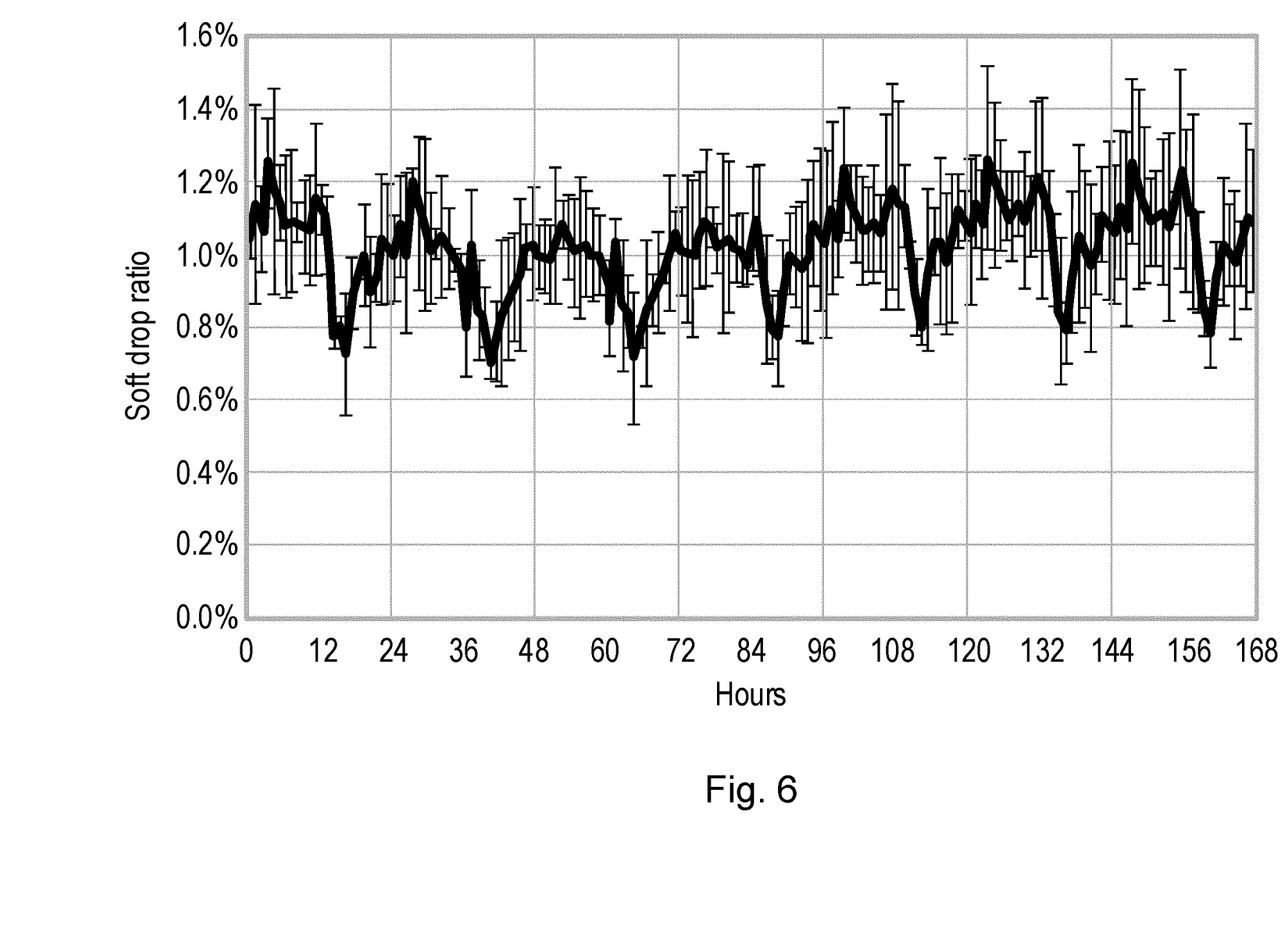
FIG. 6 is a graph illustrating exemplary predicted soft drop ratios and associated confidence intervals for a period of a week.

As noted, the exemplary method and/or procedure shown in FIG. 5 or 7 can be performed by the apparatus or device 200 shown in FIG. 2, the virtual apparatus or device 300 shown in FIG. 3, or the virtualisation environment 400 shown in FIG. 4. Any of these may be part of, or associated with, the communication network. Embodiments of this disclosure provide an apparatus, device, virtual apparatus or virtual device configured to perform the method in FIG. 5, FIG. 7, or any embodiment of the methods presented in this disclosure. Other embodiments of this disclosure provide an apparatus, device, virtual apparatus or virtual device comprising a processor and a memory, e.g. processing circuitry 201 and memory 203 in FIG. 2 or processing circuitry 360 and memory 390-1 in FIG. 3, with the memory containing instructions executable by the processor so that the apparatus, device, virtual apparatus or virtual device is operative to perform the method in FIG. 5 or 7 or any embodiment of those methods presented in this disclosure.

As described herein, an apparatus, device, virtual apparatus or virtual device can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Although the term "cell" is used herein, it should be understood that (particularly with respect to 5G NR) beams may be used instead of cells and, as such, concepts described herein apply equally to both cells and beams. The use of "cell" or "cells" herein should therefore be understood as referring to cells or beams as appropriate.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method for monitoring a communication network, the method comprising:
    monitoring user plane information and control plane information for a first session provided by the communication network for a first wireless device;
    correlating the user plane information and the control plane information to determine if the first session was ended due to a soft drop, wherein a soft drop corresponds to a user of the first wireless device intentionally terminating the first session due to service quality issues;
    compiling soft drop data for a plurality of sessions provided by the communication network for a plurality of wireless devices in a first time interval to determine current soft drop behaviour for the communication network, wherein each session has values for one or more attributes relating to the session and/or the wireless device the session relates to, and wherein the current soft drop behaviour for the communication network is determined for a first set of sessions in the first time interval having a selected value or selected set of values of the one or more attributes; and
    determining if soft drop behaviour of the communication network is anomalous by comparing the determined current soft drop behaviour to soft drop behaviour predicted for the first time interval, wherein the soft drop behaviour predicted for the first time interval is based on soft drop data for a second set of sessions provided by the communication network for a plurality of wireless devices in a second time interval that was before the first time interval, wherein the sessions in the second set of sessions have the selected value or selected set of values of the one or more attributes.

2. The method as claimed in claim 1, wherein the current soft drop behaviour for the first set of sessions comprises a soft drop ratio that is a ratio of the number of sessions in the first set of sessions that are determined to have been ended due to a soft drop to the total number of sessions in the first set of sessions.

3. The method as claimed in claim 1, wherein the method comprises determining if the current soft drop behaviour of the communication network is anomalous by comparing the determined current soft drop behaviour to the soft drop behaviour predicted for the first time interval.

4. The method as claimed in claim 1, wherein the soft drop behaviour predicted for the first time interval comprises a predicted soft drop ratio that is a ratio of the number of sessions that are predicted to end due to a soft drop to a predicted total number of sessions.

5. The method as claimed in claim 1, wherein the soft drop behaviour predicted for the first time interval comprises a confidence interval, and wherein the step of determining if the soft drop behaviour of the communication network is anomalous comprises determining the soft drop behaviour of the communication network is anomalous if the determined current soft drop behaviour is outside of the confidence interval for the soft drop behaviour predicted for the first time interval.

6. The method as claimed in claim 1, wherein the one or more attributes relating to the session and/or the wireless device the session relates to comprises any of a wireless device vendor identity, a wireless device model, or a wireless device software version.

7. The method as claimed in claim 1, further comprising, for each of different wireless device vendor identities, wireless device models, or wireless device software versions, reporting whether or not soft drop behaviour associated with that wireless device vendor identity, wireless device model, or wireless device software version is anomalous as compared to soft drop behaviour associated with other wireless device vendor identities, wireless device models, or wireless device software versions.

8. The method as claimed in claim 1, wherein the one or more attributes relating to the session and/or the wireless device the session relates to comprises any of a cell/site identifier, an Internet Protocol (IP) address of the serving core network (CN) and Internet Protocol (IP) Multimedia Subsystem (IMS) nodes, or a frequency band used for the session.

9. The method as claimed in claim 1, further comprising, for each of different values or different sets of values of the one or more attributes, reporting whether or not soft drop behaviour associated with that value or set of values is anomalous.

10. A non-transitory computer readable medium on which is stored computer readable code that is configured such that, on execution by a computer or processor in a communication network, the computer or processor is caused to:
monitor user plane information and control plane information for a first session provided by the communication network for a first wireless device;
correlate the user plane information and the control plane information to determine if the first session was ended due to a soft drop, wherein a soft drop corresponds to a user of the first wireless device intentionally terminating the first session due to service quality issues;
compile soft drop data for a plurality of sessions provided by the communication network for a plurality of wireless devices in a first time interval to determine current soft drop behaviour for the communication network, wherein each session has values for one or more attributes relating to the session and/or the wireless device the session relates to, and wherein the current soft drop behaviour for the communication network is determined for a first set of sessions in the first time interval having a selected value or selected set of values of the one or more attributes; and
determine if soft drop behaviour of the communication network is anomalous by comparing the determined current soft drop behaviour to soft drop behaviour predicted for the first time interval, wherein the soft drop behaviour predicted for the first time interval is based on soft drop data for a second set of sessions provided by the communication network for a plurality of wireless devices in a second time interval that was before the first time interval, wherein the sessions in the second set of sessions have the selected value or selected set of values of the one or more attributes.

11. An apparatus for monitoring a communication network, the apparatus comprising a processor and a memory, said memory containing instructions executable by said processor whereby said apparatus is configured to:
monitor user plane information and control plane information for a first session provided by the communication network for a first wireless device;
correlate the user plane information and the control plane information to determine if the first session was ended due to a soft drop, wherein a soft drop corresponds to a user of the first wireless device intentionally terminating the first session due to service quality issues;
compile soft drop data for a plurality of sessions provided by the communication network for a plurality of wireless devices in a first time interval to determine current soft drop behaviour for the communication network, wherein each session has values for one or more attributes relating to the session and/or the wireless device the session relates to, and wherein the current soft drop behaviour for the communication network is determined for a first set of sessions in the first time interval having a selected value or selected set of values of the one or more attributes; and
determine if soft drop behaviour of the communication network is anomalous by comparing the determined current soft drop behaviour to soft drop behaviour predicted for the first time interval, wherein the soft drop behaviour predicted for the first time interval is based on soft drop data for a second set of sessions provided by the communication network for a plurality of wireless devices in a second time interval that was before the first time interval, wherein the sessions in the second set of sessions have the selected value or selected set of values of the one or more attributes.

12. The apparatus as claimed in claim 11, wherein the current soft drop behaviour for the first set of sessions comprises a soft drop ratio that is a ratio of the number of sessions in the first set of sessions that are determined to have been ended due to a soft drop to the total number of sessions in the first set of sessions.

13. The apparatus as claimed in claim 11, said memory containing instructions executable by said processor whereby said apparatus is configured to determine if the current soft drop behaviour of the communication network is anomalous by comparing the determined current soft drop behaviour to the soft drop behaviour predicted for the first time interval.

14. The apparatus as claimed in claim 11, wherein the soft drop behaviour predicted for the first time interval comprises a predicted soft drop ratio that is a ratio of the number of sessions that are predicted to end due to a soft drop to a predicted total number of sessions.

15. The apparatus as claimed in claim 11, wherein the soft drop behaviour predicted for the first time interval comprises a confidence interval, and wherein the apparatus is configured to determine the soft drop behaviour of the communication network is anomalous if the determined current soft drop behaviour is outside of the confidence interval for the soft drop behaviour predicted for the first time interval.

16. The apparatus as claimed in claim 11, wherein the one or more attributes relating to the session and/or the wireless device the session relates to comprises any of a wireless device vendor identity, a wireless device model, and a wireless device software version.

17. The apparatus as claimed in claim 16, said memory containing instructions executable by said processor whereby said apparatus is configured to, for each of different wireless device vendor identities, wireless device models, or wireless device software versions, report whether or not soft drop behaviour associated with that wireless device vendor identity, wireless device model, or wireless device software version is anomalous as compared to soft drop behaviour associated with other wireless device vendor identities, wireless device models, or wireless device software versions.

18. The apparatus as claimed in claim 11, wherein the one or more attributes relating to the session and/or the wireless device the session relates to comprises any of a cell/site identifier, an Internet Protocol (IP) address of the serving core network (CN) and Internet Protocol (IP) Multimedia Subsystem (IMS) nodes, or a frequency band used for the session.

19. The apparatus as claimed in claim 11, said memory containing instructions executable by said processor whereby said apparatus is configured to, for each of different values or different sets of values of the one or more attributes, report whether or not soft drop behaviour associated with that value or set of values is anomalous.

* * * * *